FIP8102 XR 3,254,159

CROSS REFERENCE [redacted]

179-41

SUBSTITUTE FOR MISSING COPY

INVENTOR
EDGAR R. CONDICT
BY Harvitz & Rose
ATTORNEYS

May 31, 1966 E. R. CONDICT 3,254,159

TELEPHONE ADAPTER

Filed April 10, 1962 2 Sheets-Sheet 2

INVENTOR

EDGAR R. CONDICT

BY

ATTORNEYS

United States Patent Office 3,254,159

Patented May 31, 1966

3,254,159
TELEPHONE ADAPTER

Edgar R. Condict, New London, N.H., assignor to Bio-Tronics Research, Inc., New London, N.H., a corporation of New Hampshire Filed Apr. 10, 1962, Ser. No. 186,395
10 Claims. (Cl. 179—41)

The present invention relates generally to systems for coupling points remote from a telephone network to selected telephone stations in the network and more particularly to a system for connecting a remote radio station into a telephone network via a radio link, wherein no external wiring connections need be made to existing telephone equipment.

In the past, all systems which have automatically connected a remote station and a telephone network via a radio link have required electrical connections to internal telephone substation equipment. This has the obvious drawback of requiring a specially built or wired telephone if existing telephone company regulations are not to be violated.

The present invention provides a system requiring no internal wiring connections in a telephone network, while permitting transmission from a remote station to and from the telephone network via a radio link. Communication between the remote station and the telephone network is accomplished through an intermediate station. It is then possible to receive messages at the remote location, from any instrument in the network, via the intermediate station and to transmit messages from the remote location to any instrument in the network, via the intermediate station, without human intervention.

At the intermediate station, a first transceiver is provided which transmits and receives RF signals containing audio and telephone ringing information via a radio link. Another transceiver is provided at the remote station for transmitting and receiving audio and telephone dialing information signals, via the intermediate station. The intermediate station includes a coil which detects the electromagnetic energy established when a telephone substation is to be rung. Energization of the coil by a phone ring causes an audio frequency tone to be generated and activates the transceiver at the intermediate station into the transmit state. The tone modulates the transmitter portion of the transceiver at a predetermined frequency. The modulated signal is received at the remote unit, is detected and the detected signal is utilized for activating an indicator, for example, a buzzer. The operator at the remote station now has information that the telephone at the intermediate station has been rung. He activates the remote transceiver unit into its transmitting state and cause a predetermined, fixed frequency signal to modulate the RF link. This signal is received at the intermediate station and causes its telephone to be connected into the network.

The telephone substation at the intermediate station, which is a normal instrument, is maintained with its hand set off the cradle switch. The cradle switch is maintained normally in position to prevent the telephone receiver from being connected into the network, by a solenoid activated armature, which normally presses on the cradle. When the predetermined, fixed signal from the remote station is received at the intermediate station, the solenoid is energized to raise the armature from the cradle. This permits the telephone at the intermediate receiver to be connected into the telephone network.

The system is now in condition for audio transmission between the telephone network and the remote station via the intermediate station. The voice frequency transmitted from the telephone network to the telephone headset at the intermediate station activates its transceiver into the transmit state and modulates the transmitter. When the speaker in the telephone network completes his conversation, the intermediate transceiver is activated into the receiving state. Conversation by the speaker at the remote unit is now permitted and results in modulation of the RF signal transmitted between the remote and intermediate transceivers.

When the operator at the remote location or station desires to call a party in the telephone network, he activates the same signal that was utilized for releasing the cradle switches when the telephone receiver at the intermediate station was rung. This causes the intermediate telephone to be connected into the telephone network. In dialing a number, the signal which maintains the cradle switches in an on or up position, is interrupted at a rate equal to the dialing pulse rate in a standard telephone system. This results in activation of the cradle switches at the same rate as normal dialing pulses, so that dialing occurs as with a standard dial mechanism. When the number has been rung by the remote station, conversation between the station called in the network and the remote station is possible. Such conversation is accomplished in the same manner as when the link is established between the network and the remote station.

It is an object of the present invention to provide a new and improved system for communicating telephone dialing and message information between a remote point and a telephone network, via an intermediate station.

It is an object of the present invention to provide a system for transmitting telephone ringing, dialing and speech information between a remote station and a telephone network via an intermediate telephone station wherein no internal connections to the telephone elements at the intermediate network are required.

It is another object of the present invention to provide a system for dialing a point in a telephone network from a remote point via a radio link and an intermediate station, wherein no connections need be made to telephone apparatus in the network.

It is a further object of the present invention to provide a radio telephone system for indicating, at a remote station, the occurrence of a telephone ring at an intermediate station in a telephone network, wherein no internal connections to the telephone elements at the intermediate station are necessary.

It is still a further object of the present invention to provide a new and improved system for dialing telephone numbers from a point remote from a telephone network via a radio link, wherein the cradle switches of the telephone element at the intermediate station are activated and deactivated at a rate commensurate with the dialing pulse rate in a telephone system.

The above and still further objects, features and advantages of the present invention will become apparent upon consideration of the following detailed description of one specific embodiment thereof, especially when taken in conjunction with the accompanying drawings, wherein.

Figures 1, 2:
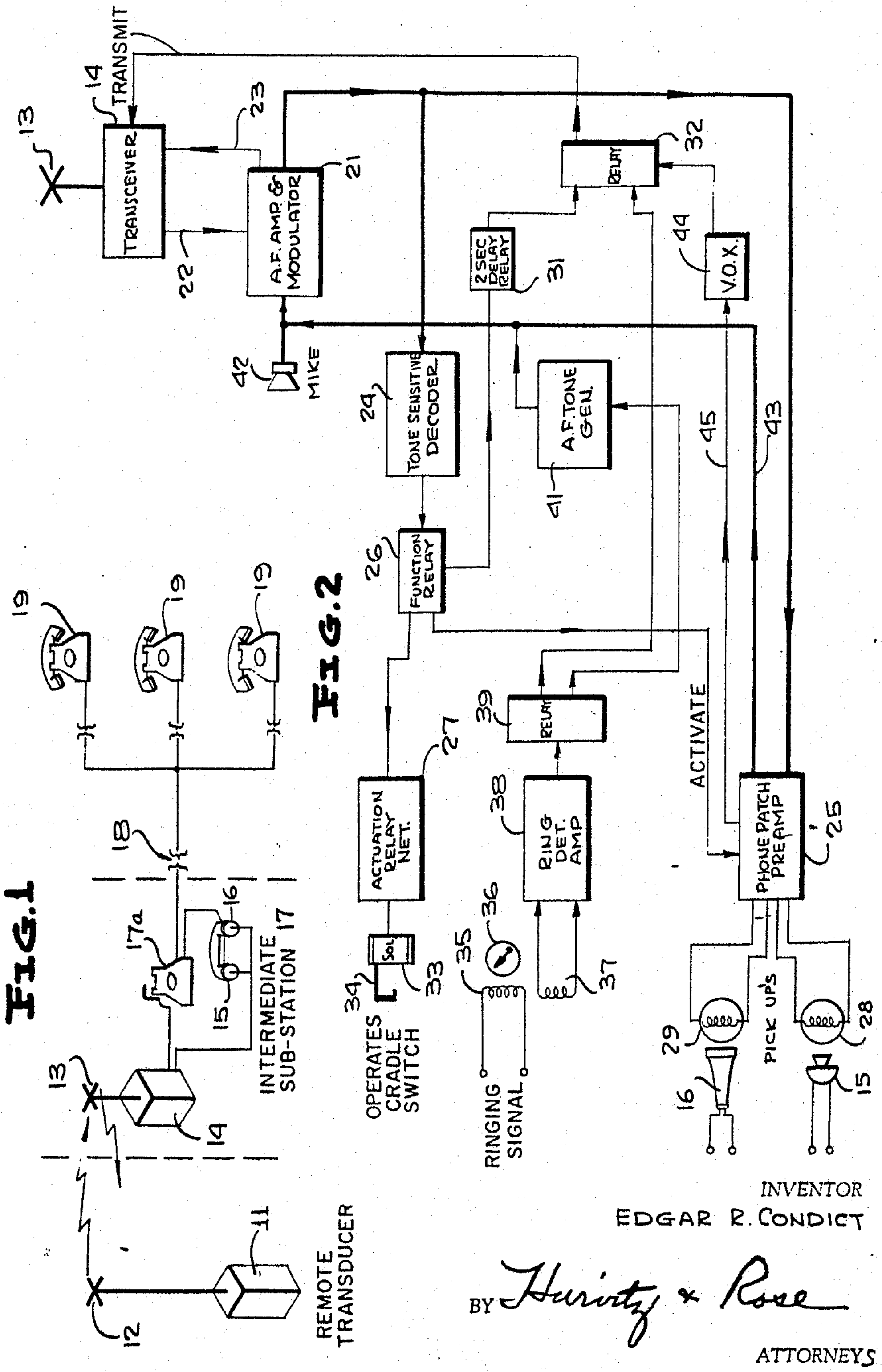
FIGURE 1 is a block diagram of a system according to the invention.
FIGURE 2 is a block diagram of an intermediate station, included in FIGURE 1.

Reference is now made to FIGURE 1 of the drawings which discloses, in block diagram form, the apparatus with which the present invention is to be utilized. A remote transceiver 11, which may be mobile or stationary, has an antenna 12 which transmits to and receives from antenna 13 at a further receiver 14. Transceiver 14 is connected to the audio input and output transducers 15 and 16, respectively, of intermediate telephone substation 17. Further connections are provided between the transceiver 14 and the telephone substation 17 for activating a pulsing mechanism at the telephone 17*a* of substation 17 and for detecting the presence of a ring in the telephone 17*a*. This apparatus is discussed more fully in connection with FIGURES 2, 3, and 4.

Telephone substation 17 is interconnected in a telephone network 18 to the various telephone equipments which normally make up a telephone network. Both dialing and audio information are transmitted and received via the radio link between transceivers 11 and 14 so that the remote transceiver 11 may be interconnected with any of the telephone instruments 19 of network 18. Thus, a two-way communication system between any instrument 19 included in the system and the remote transceiver 11, is provided.

Reference is now made to FIGURE 2 of the drawings which discloses, in block diagram form, the apparatus employed at the intermediate substation 17. Antenna 13 is coupled to transceiver 14. The detected output of transceiver 14 is applied via lead 22 to the input of audio frequency amplifier 21, while the output of the modulator 21 is applied via lead 23 to the input of transceiver 14. The signal on lead 23 is of suitable radio frequency, e.g., in the citizen's band, modulated with a voice signal or with a predetermined audio frequency pulse signal, for activation of equipment at remote station 11.

The amplified audio frequency output of amplifier-modulator 21 is applied to tone sensitive decoder 24 and phone-patch pre-amplifier 25. When a predetermined, fixed frequency signal is derived from amplifier and modulator 21, decoder 24 generates an output signal of a D.C. nature for activation of function relay 26. Activation of function relay 26 indicates that the remote station 11 is transmitting a telephone information dialing signal for transmission to telephone substations 19 of the telephone network 18, or that the telephone receiver at substation 17 is to be connected to the remainder of the network in response to reception of a telephone ringing signal.

Three parallel output signals are derived from function relay 26 when it is energized by decoder 24. The first of these signals is applied to energize actuation relay network 27, the second is applied to activate phone-patch pre-amplifier 25 to couple the voice signal from amplifier 21 to the telephone transducers 28 and 29, and the third output of relay 26 is applied to a two-second delay relay 31.

When function relay 26 is activated for two seconds or longer, relay 31 is energized, causing activation of transmit relay 32. When transmit relay 32 is activated, the transceiver is switched to its transmit state.

Activation of function relay 26 for a sufficient period of time, for example four seconds, results in an output signal from network 27 to energize solenoid 33. The armature 34 of solenoid 33 normally presses the cradle switch of the telephone substation element 17 to disconnect the telephone from the remainder of network 18. When solenoid 33 is energized in response to signals from network 27, the armature 34 is raised, thereby permitting the cradle switch of substation 17 to be released, and the telephone substation 17 is interconnected in the network 18.

When function relay 26 is energized to cause phone-patch preamplifier 25 to connect the output of amplifier 21 to the telephone transducers 28 and 29, the coil 28 activates a speech diaphragm which produces speech signal replicas of the speech derived at the remote transceiver 11. The speech signals from transducer 28 are received by standard telephone transmitter 15 and applied to the network 18 in a normal manner.

When a ringing signal is applied to coil 35 in the telephone substation, causing the bell 36 to be activated, an electromagnetic field is generated and detected by coil 37. The electromagnetic signal detected by coil 37 is applied to the input terminals of ring detector and amplifier 38, which provides an output for activating relay 39.

The output of relay 39 is applied to parallel to two second delay relay 32 and to audio frequency tone generator 41, resulting in activation of relay 32 to cause transceiver 14 to be placed in its transmit state. Activation of tone generator 41 results in a constant, fixed frequency signal being applied to the input terminals of amplifier-modulator 21. This fixed frequency signal modulates the carrier wave transmitted from antenna 13 to provide information at the remote station 11 that the bell coil 35 is activated.

Amplifier 21 is connected to microphone 42, so that the usual type of voice communication between a pair of transceivers may be effected. A further voice signal is applied to the input of amplifier 21 from preamplifier 25, via lead 43. When preamplifier 25 is not activated by the output of amplifier modulator 21, it is always maintained in a state such that the audio signal in coil 29 is applied on lead 43.

The coil 29 of a standard magnetic headphone set is coupled with the receiver 16 of the substation. The voice signals coupled into coil 29 are coupled both to modulator 21, via lead 43, and to a voice operated relay 44, via lead 45. Voice operated relay 44 detects the presence of the voice signal derived from preamplifier 25 and closes its contact in response to such a signal. Closing of the contacts of voice operated relay 44 results in activation of relay 32 to the transmit state.

Relay 32 is normally maintained in the receive state, so that at all times, other than when a signal is applied thereto from relays 31, 39 and 44, the transceiver 14 is adapted to provide output signals on lead 22. Only when relay 32 is energized by one of the relays 31, 39 or 44, is the transceiver 14 energized to its transmit state.

Figures 3, 4, 5:
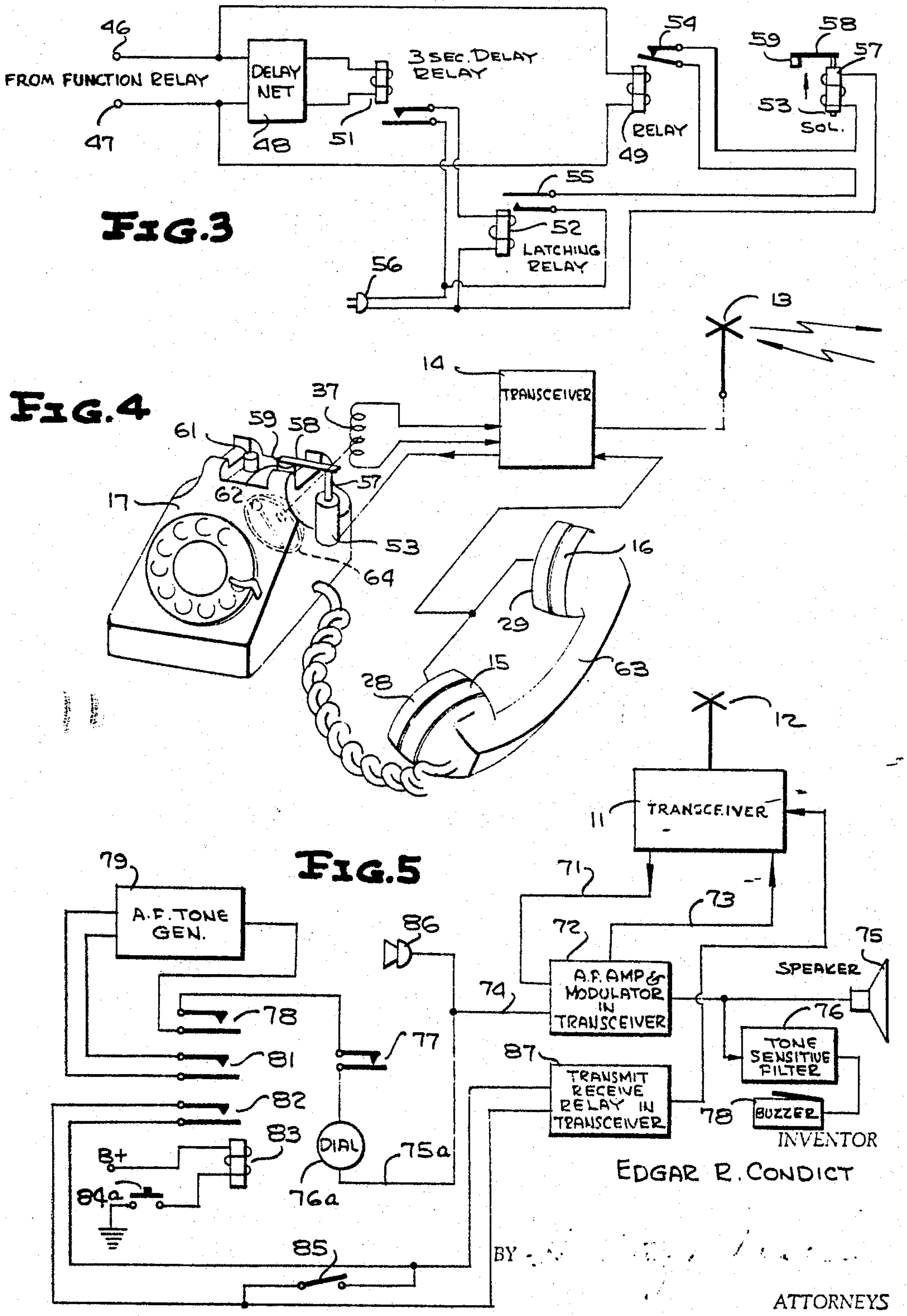
FIGURE 3 is a schematic wiring diagram of a portion of the apparatus of FIGURE 2.
FIGURE 4 is a representation of mechanical telephony equipment employed at the intermediate station.
FIGURE 5 is a block diagram of the equipment utilized at the remote station.

Reference is now made to FIGURE 3 of the drawings which specifically discloses the circuit of the actuation relay network 27 employed in FIGURE 2. The actuation relay network 27 comprises a pair of input terminals 46 and 47, shown as a single line in FIGURE 2, connected to the output circuit of function relay 26, and when function relay 26 is activated in response to a signal from decoder 24, an energizing signal is applied to terminals 46, 47. The energizing signal is applied in parallel to delay network 48 and the coil of relay 49. The output circuit of delay network 48 is connected to the energizing coil of relay 51, which has its contacts normally open. The contacts of relay 51 are connected in series circuit with a 115 volt A.C. outlet plug and the energizing coil of latching relay 52. A series circuit comprising solenoid coil 53, the normally closed contacts 54 of relay 49, the normally open contacts 55 of relay 52 can be energized from the plug 56, when the normally open contacts 55 of latching relay 52 are closed.

Armature 57 of solenoid 53 is mechanically coupled to arm 58, terminating in foot 59. Armature 57 is normally located so that foot 59 presses the cradle switch of telephone substation receiver 17. Thereby, the telephone substation is normally disconnected from the network 18.

When a long duration signal, three seconds or more, is applied to terminals 46 and 47, latching relay 52 is activated, thereby closing normally open contacts 55. The contacts 55 remain in the closed position subsequent to termination of the signal at terminals 46 and 47, so that solenoid coil 53 is maintained energized. Energization of coil 53 forces armature 57 upwardly, thereby releasing foot 59 from the cradle switch of the telephone receiver. The foot 59 remains out of contact with the cradle switch until another three second pulse is received at terminals 46 and 47. When the subsequent pulse is received, latching relay 52 is released and solenoid coil 53 deactivated. Deactivation of relay coil 53 results in foot 59 being again forced against the cradle switch of the telephone receiver.

The delay network 48 is included between terminals 46 and 47, and relay coil 51 to insure activation of relay coil 52 at a time subsequent to termination of the signal between terminals 46 and 47. Application of a signal to terminals 46 and 47 results in energization of relay 49 promptly and opening of normally closed contacts 54. If contacts 55 of relay 52 are closed prior to the de-energization of relay coil 49, it is possible that the proper circuit will not be established for activation of coil 53.

When short duration interruptions occur of the signal applied between terminals 46 and 47, relay 49 is activated. The interruptions occur at a rate equal to the normal rate of dialing pulses, considerably less than the required time for activation and deactivation of relay coil 52, and result in energization and de-energization of coil 53. As the coil 53 is activated at the same rate as telephone dialing pulses, armature 57, arm 58 and foot 59 are activated into and out of contact with the cradle switches on the telephone receiver. Thereby, the telephone line is switched on and off at the same rate as the occurrence of dialing pulses and specific phones in the network are selected, pursuant to the code dialed.

Reference is now made to FIGURE 4 of the drawing which discloses the mechanical arrangement of the telephone substation at the intermediate station. A standard telephone instrument 17 includes a pair of cradle switch actuators 61 and 62. Cradle switch actuator 62 is mechanically coupled to the foot 59 engaging arm 58 attached to armature 57. The telephone handset 63 is remotely located from its usual position on the cradle switch actuators 61, 62 so that energization of solenoid coil 53 in response to signals from transceivers 14 is possible. The transmitter and microphone of handset 63 are acoustically coupled to activate coils 28 and 29, coupled to transceiver apparatus 14. Disposed at the rearward portion of telephone 17 is pickup coil 37, for detecting the presence of the electromagnetic field generated when the telephone bell 64, inside the instrument 17, is activated. Coil 37 is connected by suitable wires to the input terminals of transceiver 14. The output of transceiver 14 is coupled to the antenna 13 for reception of signals from transceiver 11.

Reference is now made to FIGURE 5 of the drawings which discloses the apparatus incorporated at the remote station. The signal received and transmitted from remote station 12 is coupled into and out of transceiver 11 via antenna 12. The transceiver 11, when connected in its normal receiving state, provides an audio output signal from its internal detector on output lead 71. The signal on lead 71 is applied to the audio amplifier in amplifier-modulator 72. Amplifier-modulator 72 provides an output signal on lead 32, indicative of the audio signal applied thereto on lead 74. The signal on lead 73 applied to the transceiver 11 when it is switched into its transmitting state, is an RF signal modulated according to the audio input signal on lead 74. The audio output signal of amplifier-modulator 72 is applied, in parallel, to a speaker 75 and a tone sensitive filter 76.

Filter 76 is adapted to pass only the frequency generated by intermediate station 14, as derived from the tone generator 41 thereof. In the alternative, filter 76 may be a tone sensitive squelch which drives an output when all frequencies (including noise), except the tone, is received. The output of tone filter 76 is coupled to a relay which activates an indicator, buzzer 78. When buzzer 78 is activated, an indication is provided to the operator of the remote unit that the telephone 17 at the intermediate station has been dialed and is ringing.

Control signals for the telephone apparatus at the intermediate station are coupled via the radio link by way of dial 76*a* and leads 75*a*, modulator 72, lead 73 and transceiver 11. The circuit for the control signal derivation comprises a series circuit; including the dial 76*a*, the dial interrupter contacts 77, the normally open contacts 78, and audio frequency tone generator 79.

Normally open contacts 78, 81 and 82 of relay 83 are closed when the relay is activated by manual control switch 84*a*. Closure of normally open manual switch 84*a* results in closure of relay contacts 78, 81 and 82, permitting establishment of power within tone generator 79 by way of contacts 81. The output of the tone generator is coupled, as indicated supra, to lead 75*a* by way of contacts 78 upon activation of relay 83. Closing of contacts 82 results in activation of relay 84 for rendering transceiver 11 in the transmitting state. Relay 87 is also activated by a further manual control switch 85, connected in parallel with contacts 82 for permitting transmission from the transceiver once the telephone connections are established at the intermediate station.

The complete description of the functioning of the apparatus of the present invention will now be presented.

First it will be assumed that a call is being made from a substation within network 18 to intermediate station 17. This results in an electromagnetic field being produced by coil 35 and detected by coil 37. Activation of the ringing coil 35 results in a signal applied to audio frequency tone generator 41 and transmit-receive relay 32 in the intermediate station, FIGURE 2. Application of the pulse to relay 32 causes transceiver 14 to be switched from its normal receiving state to a transmitting state.

Activation of tone generator 41 results in transceiver 14 transmitting RF energy modulated at a predetermined fixed frequency. This RF signal is received at remote station 11 by antenna 12, detected and applied through filter 76 to buzzer 78. When the operator of the remote unit hears buzzer 78, he depresses function switch 84 for at least 4 seconds. This causes the relay contacts 78, 81, and 82 of relay 83 to be closed. Closure of contacts 78, 81 and 82 results in transmission from transceiver 11 of a fixed, predetermined audio frequency modulation. This signal is received by transceiver 14 and causes function relay 26 to be activated, since decoder 24 includes a filter tuned to the predetermined frequency of tone generator 79. It is necessary that switch 84 be activated for four seconds to assure that latching relay 52, FIGURE 3, is energized.

Activation of function relay 26 results in the establishment of connections between preamplifier 25 and headphone element 28 to the input of amplifier-modulator 21 via lead 43, as well as switching of transceiver 14 to the transmit state. When the first utterances of the party phoning within the network 18 are received at coil 28, they are coupled via lead 43, and the radio link comprising transceiver 14, antennas 13 and 12 to transceiver 11.

The audio speech signals are detected and coupled through the amplifier 72 to speaker 75. Upon completion of the first utterances of the party making the call at a station in the network, relay 32 is deenergized. The operator at the remote unit 11 now closes the contacts of switch 85 and speaks into microphone 86. The speech signals applied by the operator to microphone 86, cause modulation of the signal transmitted from transceiver 11. The modulated signal is received at transceiver 14, detected and coupled to phone-patch preamplifier 25. The phone-patch preamplifier is in its normal state so that the output of amplifier 21 is coupled to coil 29, and through microphone 16 into the telephone network.

When the operator of the remote equipment desires to phone someone in the telephone network, he closes the switch contacts 84*a*, thereby activating relay 83. Activation of relay 83 at this time has the same effect as activation thereof by the operator when he is informed by a buzzer 78 that the phone is being rung at the intermediate station. After the switch contacts 84*a* have been closed for the required time period, to insure release of foot 59 from the cradle switch element 61, dialing is accomplished. Rotation of dial 76 results in opening of contacts 77; thereby, causing interruptions in the modulating signal applied to amplifier 72 at a rate equal to the normal dialing pulses in a telephone system. The interruptions are received at antenna 13 and coupled to tone sensitive decoder 24 which activates function relay 26 at the same rate as dialing pulses in a telephone system. Operation of relay 26 at this rate results in corresponding activation and deactivation of relay 49. Activation of relay 49 at such a rate results in foot 59 being released from the cradle switch 61 at a rate sufficiently high as to cause opening and closing of the telephone line to effect dialing in the network.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A communications system comprising, a remote radio transmitter-receiver system, an intermediate radio transmitter-receiver system, a telephone network including a plurality of telephone substations wherein the telephone substations have handset means and audio transducers therein for sound sensing and production, a bell ringing means at each of said substations, and cradle switch means in one of said substations, said cradle switch means being operative to connect telephone substations selectively to the telephone network, means at said remote radio transmitter-receiver for at will generating and transmitting telephone code pulses, means controlled by said telephone code pulses opening and closing said cradle switch means in response to the telephone code pulses from the remote radio transmitter-receiver system to thereby signal the number of a further telephone substation, means at the intermediate radio transmitter-receiver system for responding to the ringing of the selected telephone substation bell and communicating bell ringing information to the remote radio transmitter-receiver system, means at the remote radio transmitter-receiver system responsive to the bell ringing information from the intermediate radio transmitter-receiver system to produce a signal indicating that the last mentioned telephone substation bell is ringing, and means for coupling audio signals between the intermediate radio transmitter-receiver system and the telephone network via said one of said substations.

2. The combination of claim 1 wherein the means for opening and closing the cradle switch means is completely exterior to the telephone substation.

3. A communcation system adapted for use as an extension of a telephone network including a plurality of telephone substations wherein the telephone substations have handset means and audio transducers therein for sound sensing and production, a bell ringing means at each of said substations, and cradle switch means in one of said substations, said cradle switch means being operable to connect other telephone substations selectively to the telephone network, comprising a remote radio transmitter-receiver system, an intermediate radio transmitter-receiver system, means at said remote radio transmitter-receiver for at will generating and transmitting telephone code pulses, means controlled by said code pulses for opening and closing said cradle switch means in response to the telephone code signal pulses from the remote radio transmitter-receiver to thereby signal the number of a further telephone substation, means at the intermediate transmitter-receiver system for responding to the ringing of the selected telephone substation bell and communicating bell ringing information to the remote radio transmitter-receiver system, means at the remote radio transmitter-receiver system responsive to the bell ringing information from the intermediate radio transmitter-receiver system to produce a signal indicating that the last mentioned telephone substation bell is ringing and means for coupling audio signals between the intermediate radio transmitter-receiver system and the last mentioned telephone substation.

4. The combination of claim 3 wherein the means for opening and closing the cradle switch means is completely exterior to the telephone substation.

5. Apparatus for remotely controlling a telephone comprising, a remote radio transmitter-receiver, an intermediate radio transmitter-receiver system, a telephone substation having a cradle switch for switching the telephone substation to a telephone network, means at the remote radio transmitter-receiver system for generating a carrier signal and for pulse modulating the remote radio transmitter-receiver carrier signal with a predetermined audio signal in response to a telephone pulsing mechanism, and means controlled by the intermediate radio transmitter-receiver system for connecting the telephone substation via the cradle switch to a telephone network in response to the pulses from the remote radio transmitter-receiver system.

6. A communication system adapted for use as an extension of a telephone network including a network exchange and a plurality of telephone substations wherein the telephone substations have handset means and audio transducers therein for sound sensing and production, bell ringing means for ringing a bell, and switch means accessible from the exterior of a selected one of said telephone substations for connecting the latter telephone substation to a telephone network, comprising a remote radio transmitter-receiver system, an intermediate radio transmitter-receiver system, means at the remote radio transmitter-receiver system for pulse modulating the remote radio transmitter-receiver carrier signal with a predetermined audio signal in response to a telephone pulsing mechanism, means controlled by the intermediate radio transmitter-receiver system for connecting the selected one of said telephone substations via the switch means to the telephone network in response to the pulses from the remote radio transmitter-receiver system, means at the intermediate radio transmitter-receiver system for responding to the ringing of the telephone substation bell and communicating bell ringing information to the remote radio transmitter-receiver system, means at the remote radio transmitter-receiver system responsive to the bell ringing information from the intermediate radio transmitter-receiver system to produce a signal indicating that the telephone substation bell is ringing, and means for coupling audio signals between the intermediate radio transmitter-receiver system and the telephone network via the selected one of said telephone substations.

7. The combination of claim 6 including means at the intermediate radio transmitter-receiver system to produce a signal indicating that the telephone substation bell is ringing and means for coupling audio signals between the intermediate radio transmitter system and the telephone network via the selected one of said telephone substations.

8. In combination, a telephone substation having a handset and a cradle switch, first means for at will mechanically operating said cradle switch selectively into open and closed positions, a radio receiver, means responsive to reception of control signals by said radio receiver for actuating said first means, a remote transmitter, means including said remote transmitter for transmitting said control signals to said radio receiver, said radio receiver having a speaker, said speaker being located adjacent said handset, and means for transmitting voice signals via said remote transmitter, said receiver and said speaker to said handset, while said cradle switch is closed.

9. The combination according to claim 8 wherein said telephone substation includes a bell, a local radio transmitter, a remote receiver associated with said remote transmitter, and means responsive to said bell for transmitting bell signals via said local radio transmitter to said remote receiver.

10. The combination according to claim 9 wherein a dialing mechanism is included in said remote transmitter for generating said control signals.

References Cited by the Examiner

UNITED STATES PATENTS

| | | | |
|---|---|---|---|
| 1,965,123 | 7/1934 | Kardorff | 179—18.03 |
| 2,071,227 | 2/1937 | Finch. | |
| 2,129,332 | 9/1938 | Mastini | 179—41 X |
| 2,186,899 | 1/1940 | D'Humy et al. | 179—4 |
| 2,209,327 | 7/1940 | D'Humy et al. | 179—4 |
| 2,769,033 | 10/1956 | Waldman | 179—6 |
| 2,894,121 | 7/1959 | Phillips | 325—64 |
| 2,903,517 | 9/1959 | Ridings | 179—4 |

ROBERT H. ROSE, *Primary Examiner.*

WILLIAM C. COOPER, *Examiner.*

Notice of Adverse Decision in Interference

In Interference No. 95,791 involving Patent No. 3,254,159, E. R. Condict, TELEPHONE ADAPTER, final judgment adverse to the patentee was rendered July 20, 1967, as to claims 1, 2, 3, 4, 5, 6, 7, 8, 9 and 10.

[*Official Gazette September 26, 1967.*]